Jan. 4, 1938.  F. W. HARTMAN  2,104,589
REFRIGERATING APPARATUS
Filed Feb. 23, 1934  4 Sheets-Sheet 1

INVENTOR
Frank W Hartman
BY
Spencer Hardman and Fehr
ATTORNEYS

Jan. 4, 1938.   F. W. HARTMAN   2,104,589
REFRIGERATING APPARATUS
Filed Feb. 23, 1934   4 Sheets-Sheet 2

INVENTOR
Frank W. Hartman
BY
Spencer Hardman and Fhi
ATTORNEYS

Jan. 4, 1938.  F. W. HARTMAN  2,104,589
REFRIGERATING APPARATUS
Filed Feb. 23, 1934  4 Sheets-Sheet 3

Inventor
Frank W Hartman
By Spencer Hardman and他
Attorneys

Jan. 4, 1938.　　　F. W. HARTMAN　　　2,104,589
REFRIGERATING APPARATUS
Filed Feb. 23, 1934　　　4 Sheets-Sheet 4

Inventor
Frank W Hartman
By Spencer Hardman and Fehr
Attorneys

Patented Jan. 4, 1938

2,104,589

UNITED STATES PATENT OFFICE 2,104,589

REFRIGERATING APPARATUS

Frank W. Hartman, Detroit, Mich.

Application February 23, 1934, Serial No. 712,633

11 Claims. (Cl. 128—191)

This invention relates to refrigerated apparatus and more particularly to refrigerated apparatus for administering oxygen to patients requiring oxygen treatment.

Modern oxygen therapy, which involves the use of high concentrations of oxygen under closely controlled conditions, may be said to date from the investigations of Haldane in England and of Meltzer in the United States during 1917. These investigations served to direct attention to the effectiveness of high concentrations of oxygen in the treatment of pneumonia and other diseases. During the past few years the fundamental factors underlying oxygen therapy have been scientifically studied by a number of investigators and methods have been developed for the practical application of the data thus obtained.

Thalheimer, in his work, "The Modern Hospital", has said that the oxygen atmosphere should be kept cool and relatively dry. Heretofore the control of these two factors has been most difficult with the types of oxygen therapy apparatus available and it is not uncommon to find in some of the heretofore known types of apparatus that the temperature rises to 85° or 90° F. and the relative humidity to 70% or 80%. A good combination, on the other hand is about 70° F. with 40% relative humidity.

With the objections of heretofore known apparatus in mind and in order to maintain the proper temperature and humidity within the tent, I employ thermostatically controlled electric refrigeration for cooling and dehumidifying the tent air, where the cooling preferably, although not necessarily, takes place directly within the tent.

As a further object of my invention, with a view to overcoming mechanical objections to prior existing tents, I have evolved a new canopy allowing full visibility for both patients and attendants, the new canopy being also readily portable and movable so as to allow easy access to the patient by the attendant.

Further objects and advantages of the present invention will be apparent from the following description, reference being had to the accompanying drawings, wherein a preferred form of the present invention is clearly shown.

Figure 1:
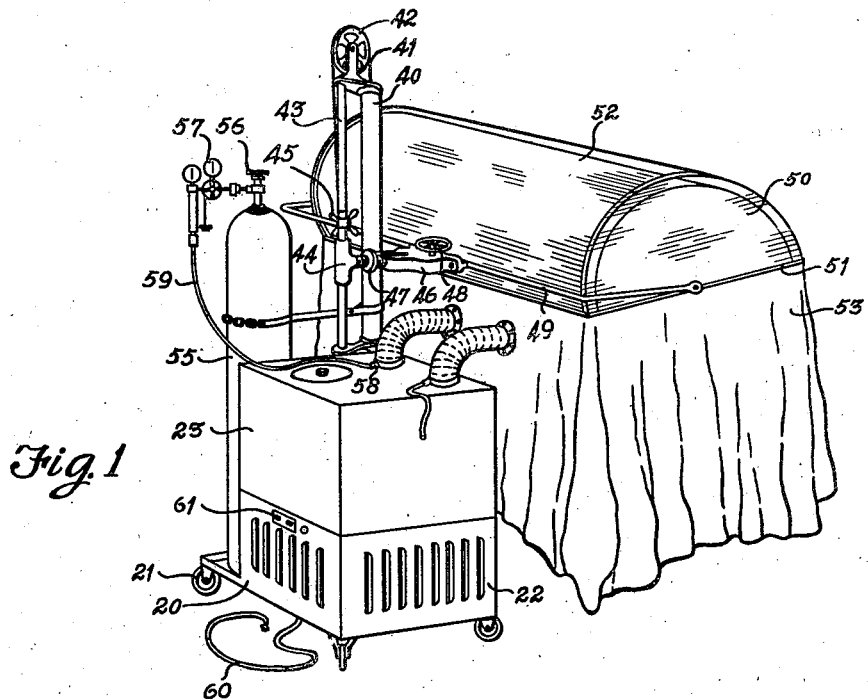
Fig. 1 is a perspective view of a portable type of oxygen administering apparatus embodying one form of my invention.
Figure 2:
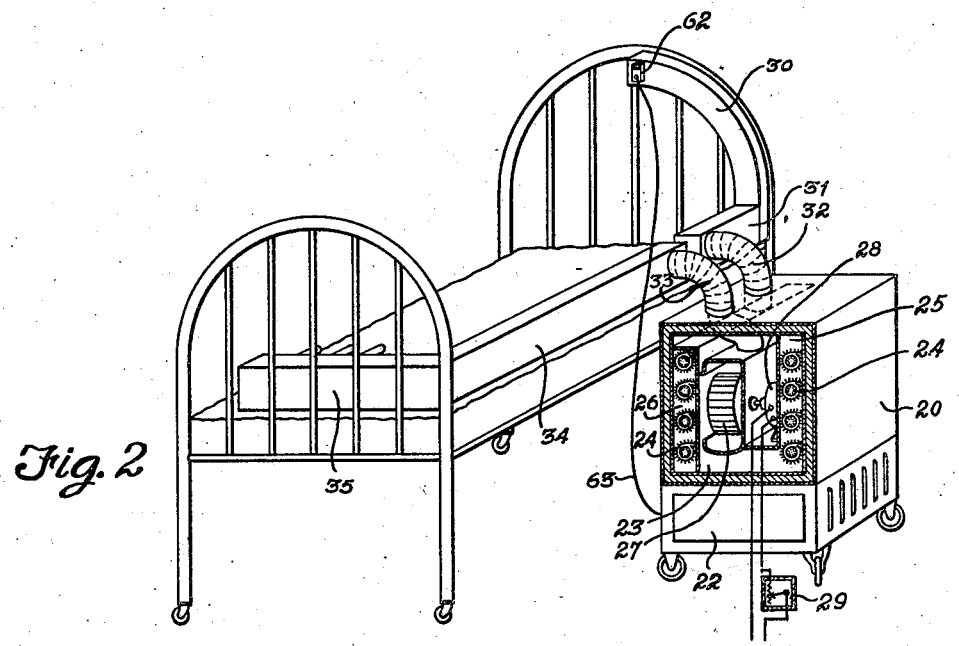
Fig. 2 is another perspective view of this form disclosing a portion of the refrigerating apparatus in section, together with a bed provided with duct means connected to the refrigerating apparatus.

Referring to the drawings and more particularly to Fig. 1, there is shown a portable oxygen administering unit 20 provided with large swivel castors 21 having in its lower portion a compartment 22 containing a refrigerant liquefying apparatus including a compressor, a condenser, and a receiver. This refrigerating apparatus preferably has a large condenser surface so that only a relatively slowly moving air stream is required for cooling of the condenser. The compressor is also of the slow speed type so as to reduce the noise. Above the chamber 22 is provided an insulated chamber 23 containing a plurality of evaporating coils 24 formed of finned tubing. These evaporating coils 24 are provided within the ducts 25 and 26. A slow speed centrifugal fan 27 is provided for drawing air through the duct means 25 and 26 over the surfaces of the evaporating coils 24. This centrifugal fan 27 is driven by a variable speed electric motor 28 under the control of a suitable rheostat or other suitable controlling means 29. The fan 27 draws air from the head portion of the enclosure near the top thereof through a square-shaped aluminum duct 30 which is in the form of an arc and connects to a horizontal duct 31 resting upon the mattress which in turn is connected by a flexible duct 32 to the ducts 25 and 26 in the portable unit 20. The air which is drawn from the enclosure through the duct 30 is returned by the fan 27 through a flexible duct 33 and a square rigid horizontal duct 34 which connects to a cross duct 35 at the foot of the bed. This cross duct 35 is provided with a plurality of outlets so as to discharge a diffused supply of cooled and oxygenated air at the foot end of the enclosure.

At one end of the portable unit 20 there is provided a supporting means for the canopy in the form of a vertical tubular member 40 within which there is provided a counterweight attached to a chain 41 which extends over a pulley 42 at the top of the tubular member 40. Parallel with the tubular member 40 is a guide and supporting rod 43 upon which slidingly mounted is a T-shaped bracket 44 which may be locked thereto by a suitable locking device 45. This bracket 44 is connected to the opposite end of the chain 41 so that it, together with the canopy, is balanced by the counterweight within the tubular member 40. Connected to one leg of the T-shaped bracket 44 is a swivel bracket 46 which is provided with a suitable lock nut 47. The angular position of this swivel bracket is controlled by a hand wheel 48. This swivel bracket 46 is connected to an elongated U-shaped member 49 which is pivotally connected at both ends to the semi-cylindrical shaped canopy 50.

This canopy 50 is provided with a rectangular frame 51 to which the bracket 49 is pivoted. Fastened to this frame 51 at the opposite end of the canopy is a semi-circular shaped piece and over this semi-circular shaped piece there extend from one side of the rectangular frame 51 to the other, a plurality of spaced sheets of a suitable translucent sheet material such as "Cellophane" or some suitable cellulose nitrate or acetate product 52 provided with one or more dead air spaces therebetween for insulating purposes. Extending downwardly from the lower edge of this semi-cylindrical canopy is a skirt 53 of some suitable material, such as a rubberized fabric or sponge rubber. The bottom edge of this skirt is intended to be tucked under the mattress of the bed and in order to conserve oxygen and to prevent oxygen leakage, it is desirable to put a rubber sheeting over the top of the mattress.

In order to supply oxygen to the interior of the canopy, there is provided upon the portable unit 20 an oxygen cylinder 55 which has at its upper end a stop cock 56 and oxygen flow meter 57 which control the supply of oxygen through a small tube 59, under the control of a second stop cock 58, to the flexible duct 33 within which it is carried by the circulating air into the interior of the canopy.

The portable unit 20 is adapted to be connected to a source of electric energy by means of the electric cord 60 and is provided with a suitable electric switch 61 for controlling its operation. The operation of the refrigerating apparatus is also controlled by a suitable mercury tube type of thermostat 62 which is connected to the refrigerating apparatus by a suitable electric cord 63. This thermostat is provided with a sealed mercury tube type of switch means because of the presence of oxygen within the canopy. By means of this thermostat 62 and the rheostat 29, the temperature and humidity of the air or atmosphere within the tent is controlled automatically.

Figure 3:
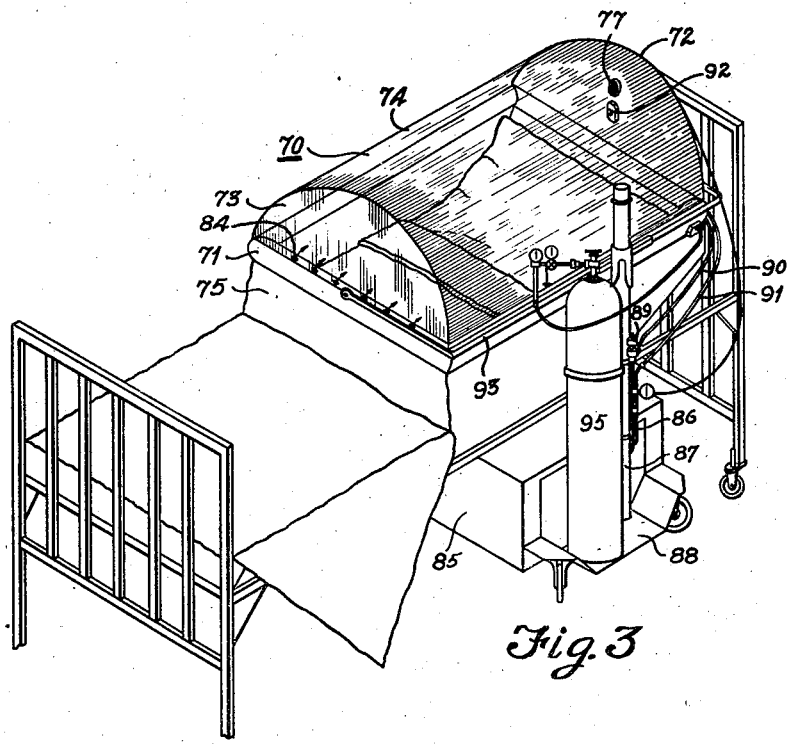
Fig. 3 is a perspective view showing a somewhat less portable, but more compact type of oxygen administering apparatus embodying another form of my invention.
Figure 4:
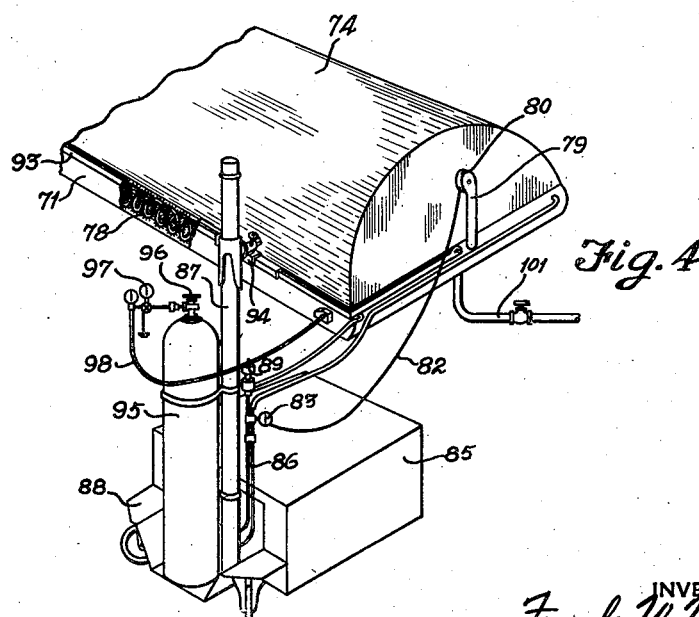
Fig. 4 is another perspective view of a portion of the apparatus shown in Fig. 3.

In Figs. 3 and 4 an oxygen administering device more suitable for large hospitals is disclosed. In this form, the canopy 70 is provided with a tubular duct means 71 at its lower edge which also forms the rectangular frame for the canopy. This canopy is provided with a semi-circular member 72 at the head end and another semi-circular member 73 at the opposite end which is translucent. The translucent sheet 74 which is of some suitable material, such as "Cellophane" or a cellulose nitrate or acetate product, extends from one side of the duct means over the arcuate periphery of the semi-circular member to the other side of the duct means 71 so as to form a rigid half-cylinder. Extending downwardly from the canopy there is provided a suitable skirt 75 of rubberized fabric or sponge rubber, the lower end of which skirt may be tucked in under the mattress or other parts of the bed clothing.

At the head end of the canopy 70 is an air inlet 77 for the duct means 71. This air inlet 77 connects with the rectangular duct means 71, through a small duct 79, shown in Fig. 4. This duct means 71 contains a plurality of refrigerant expansion coils formed of thin tubing as shown at 78 in Fig. 4. At the inlet 77 there is provided a small motor driven fan 80 for drawing air from the interior of the canopy and discharging it into the duct system. This electric motor is supplied with electric energy through the electric cord 82 under the control of a suitable rheostat 83. This air passes over the refrigerant evaporating coils between the duct means causing the temperature of this air to be reduced and also causing some dehydration of this air. The moisture which is removed from the air collects in the duct means and is drawn off from time to time through a suitable drain 101. After passing through the rectangular duct means the air is discharged from a plurality of apertures 84 at the opposite end of the enclosure.

In order to conserve space, the refrigerant liquefying apparatus is housed within a cabinet 85 provided with small castors so as to make it portable. This cabinet 85 is made low and flat so that it can be readily placed under any hospital bed. The refrigerant supply and return conduits 86 extend from this unit and are fastened to the vertical tubular supporting means 87. This vertical tubular supporting means is mounted upon the portable truck unit 88 which may be fastened to the cabinet 85. The refrigerant supply conduit is provided with a suitable adjustable expansion valve 89 so as to control the flow of liquid refrigerant to the expansion coils 78 within the duct means. By adjusting the expansion valve the evaporating temperature within the expansion coil may be controlled and this varies the cooling effect and the amount of dehydration. The refrigerant from the expansion valve 89 is supplied to the expansion coils 78 by a flexible refrigerant conduit 90 and the evaporated refrigerant is returned through a flexible conduit 91. The refrigerating apparatus is automatically controlled by a sealed mercury tube type of thermostat 92 which is mounted within the canopy. The canopy is pivotally connected to an enlarged U-shaped bracket 93 which in turn is connected to a swivel bracket 94 which is adjustably mounted upon the tubular supporting member 87.

In order to supply oxygen to the interior of the enclosure, there is provided an oxygen cylinder 95 provided with a suitable stop cock 96 and an oxygen flow meter 97 in order to control the supply of oxygen through the flexible tube 98 to the duct means 71. The duct means 71 carries this oxygen into the interior of the enclosure.

Figure 5:
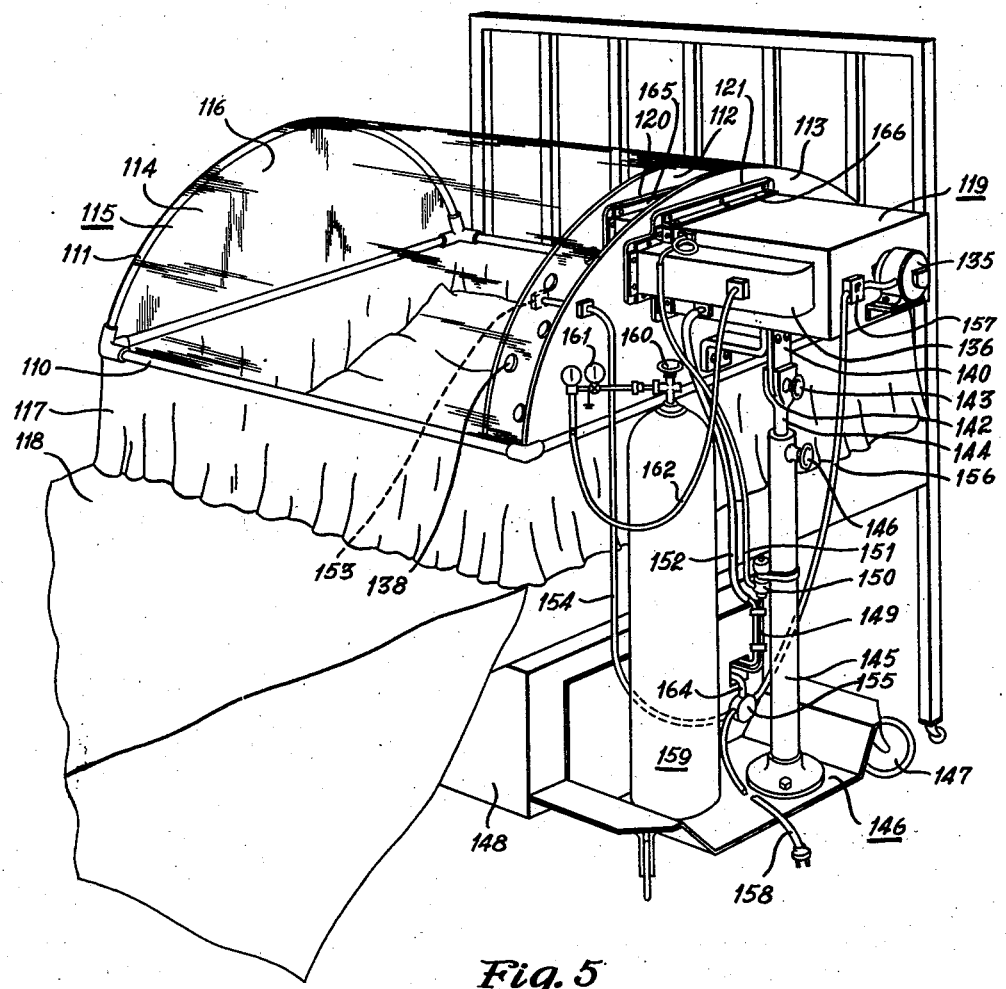
Fig. 5 is a perspective view of a head portion of a hospital bed together with another form of my oxygen administering apparatus.
Figure 6:
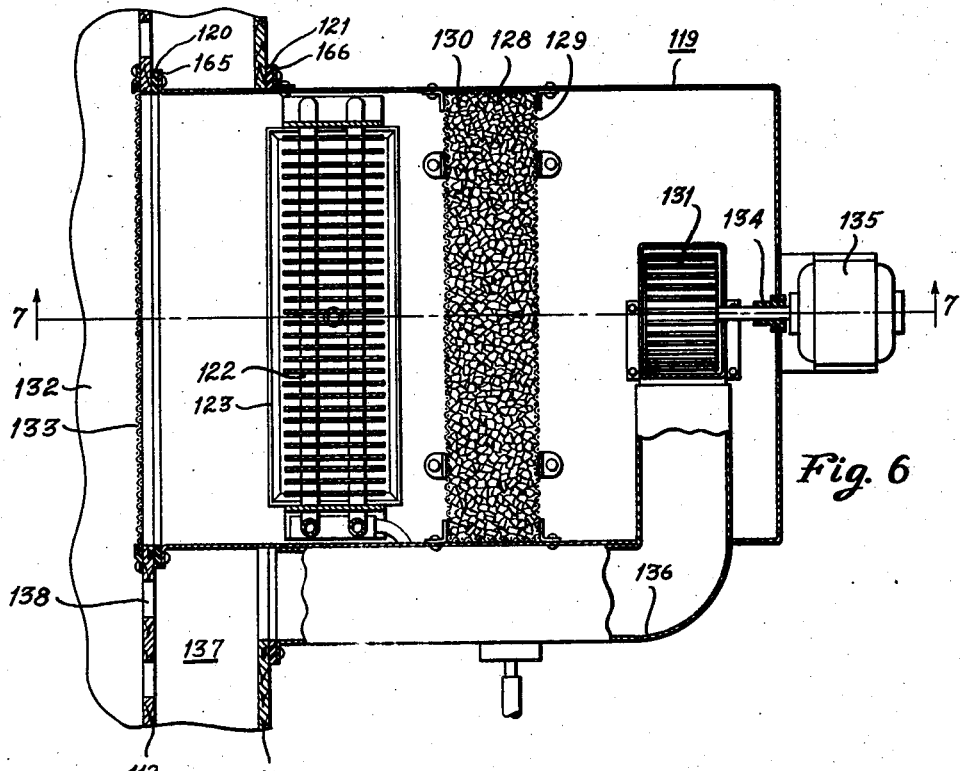
Fig. 6 is a horizontal sectional view through the duct means shown in Fig. 5.
Figure 7:
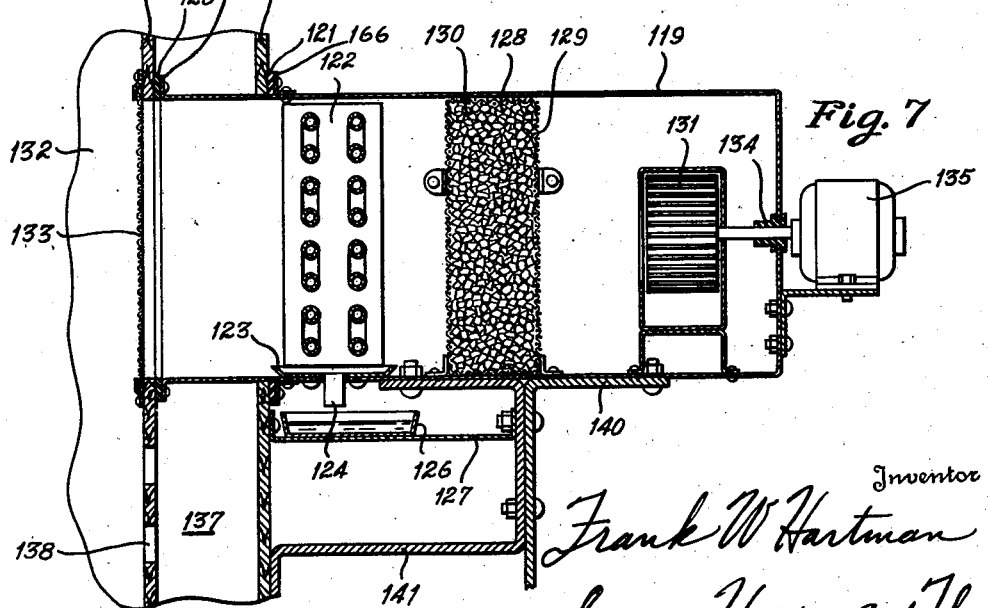
Fig. 7 is a vertical sectional view taken along the line 7—7 of Fig. 6.

In Figs. 5, 6 and 7 another form of oxygen administering apparatus is disclosed. In this form, there is provided a rectangular light weight tubular framework 110 provided with an upwardly extending arched tubular member 111 at one end and a pair of spaced semi-circular wall members 112 and 113 at the opposite end also supported by the rectangular tubular frame 110. The arched rod or tubular member 111 and the semi-circular wall members 112 and 113 support an arched translucent sheet 114 of some suitable material such as "Cellophane" or a cellulose nitrate or acetate product. This translucent sheet 114 forms the top of the canopy or tent, generally designated by the reference character 115. At the end of the tent 115 adjacent the arched tubular member 111 there is provided a translucent sheet 116 of similar material as the sheet 114. The sheets 114 and 116 are fastened to the tubular framework and the semi-circular wall members by any suitable means, such as a suitable adhesive. Extending downwardly from the rectangular tubular framework 110 are the flexible curtains 117 which provide an air seal between the tent or canopy 115 and the bed 118. These flexible curtains are preferably made of rubber or rubberized fabric so as to permit the escape of carbon dioxide from the tent but to retain the oxygen and the air therein.

Connected to the double walled portion formed of the semi-circular wall members 112 and 113 is a duct means 119 which, as better shown in Figs. 6 and 7, extends through the wall member 113 and is fastened to the wall member 112. Rubber gaskets 120 and 121 cooperating with the flanges 165 and 166 are provided for sealing the duct means 119 to the wall members 112 and 113. The duct means 119 is provided with a vertical finned type of evaporating means 122 formed of horizontally serpentine refrigerant ducts provided with vertical fins. Moisture condenses upon these vertical fins and runs down the fins and is collected in a shallow pan 123 beneath the evaporating unit 122. The shallow pan 123 collects the condensed moisture and discharges it through a drain cock 124 into a larger pan 126 which is supported by a bracket 127 beneath the evaporating means 122.

At one side of the evaporating means 122 there is provided a filter 128 formed of a screen enclosure 129 which contains some suitable filter and absorbent material 130, such as activated or granulated charcoal and soda lime, the latter being calcium oxide and sodium hydroxide. This filter removes carbon dioxide from the air by adsorption and also removes moisture and impurities from the air. At the end of the duct means 119 there is provided a quiet slow speed centrifugal fan 131 which draws air from the interior 132 of the tent or canopy 115 through the screen 133 at the entrance of the duct means 119 and through the evaporating means 122 and the filter 130. This slow speed centrifugal fan is connected through an opening provided with an air seal 134 to a small electric motor 135 located outside of the duct means 119. The centrifugal fan 131 discharges the air into a duct 136 which connects to the space 137 between the inner semi-circular wall member 112 and the outer semi-circular wall member 113. The wall member 112 is provided with apertures 138 at widely distributed points to provide diffused supply of cooled filtered air to the interior of the tent or canopy 115.

The duct means 119 and the tent or canopy 115 are supported by the brackets 140 and 141 which are fastened together as well as fastened to the duct means 119 and the outer wall 113. The bracket 140 continues downwardly and is adjustably fastened within a kerf 142 by a clamping screw 143 in the top of a vertically slidable rod 144 which is received within a tubular pedestal 145 and adjustably held by a clamping set screw 146. This tubular pedestal 145 is supported at its lower end upon a portable truck unit 146 provided with large easy rolling swivel castors 147.

This truck unit 146 also contains and supports a cabinet 148 located beneath the bed 118, which cabinet 148 contains a refrigerant liquefying apparatus which supplies liquid refrigerant through a refrigerant conduit 149 through an adjustable expansion valve 150 which controls the flow of liquid refrigerant through an insulated refrigerant conduit 151 to the evaporating means 122 located within the duct means 119. The liquid refrigerant evaporates within the evaporating means 122 and is returned to the refrigerant liquefying apparatus through an insulated return conduit 152. By adjusting the expansion valve 150, the evaporating pressure and temperature within the evaporating means 122 may be controlled and this evaporating temperature varies the cooling effect upon the circulating air and controls the amount of dehydration.

The operation of the refrigerating system is controlled by a thermostat 153 mounted upon the wall member 112 and connected by an electrical conductor 154 to a connection or junction box 155 which is mounted upon the cabinet 138. This connection or junction box 155 is connected to the refrigerant liquefying apparatus by an electrical conductor 164 and to the electric fan motor 135 through the electrical conductor 156 and finger switch 157 which controls the operation of the fan motor and centrifugal fan. The connection box 155 is also connected by a flexible electric conductor 158 to a suitable source of supply for supplying the electric energy to the refrigerant liquefying apparatus and the electric fan motor 135.

The truck unit 146 also supports an oxygen cylinder 159 which is provided with the usual stop cock 160 at its upper end which stop cock controls the flow of oxygen to an oxygen flow motor 161 which in turn controls the rate of flow of oxygen through the flexible tube 162 to the duct 136, where it diffuses into the air discharged by the centrifugal fan 131 and is conducted to the space 137 between the wall members 112 and 113 from which the mixture of oxygen and air is conducted through the distributed apertures 138 into the interior of the tent above the patient. This oxygenated air slowly falls within the tent to the level of the patient while the warm air rises and is withdrawn through the duct means 119.

With this apparatus I am able to maintain a temperature of 68° F. and a relative humidity of 45% even during the hottest and most humid summer weather. I also obtain an oxygen concentration of from 55% to 58% with an average of from 6 to 8 liters of oxygen supplied per minute. In my refrigerating system I use as a refrigerant gas a fluorochloro derivative of an aliphatic hydrocarbon, such as dichlorodifluoromethane which is non-toxic, non-odorous, and non-explosive. By the thermostat and humidity control, these conditions are maintained automatically without constant attention by the attendants.

With my improved type of canopy a very light enclosure with almost complete visibility is provided. By means of the pivoted mounting of the canopy, the canopy may readily be rotated so that the patient can readily enter and leave the enclosure and this also facilitates caring for the patient. The swivel mounting of the canopy enables the head portion of the bed to be raised and one end of the canopy to be raised along with the bed. The operation of this apparatus is comparatively simple and a technically trained operator is not required.

While the form of embodiment of the invention as herein disclosed, constitutes a preferred form, it is to be understood that other forms might be adopted, all coming within the scope of the claims which follow.

What is claimed is as follows:

1. Oxygen administering apparatus including a tent for enclosing at least the head of the patient, a closed evaporating member in heat exchange relation with the atmosphere in the tent and means for circulating the atmosphere within the tent over the closed evaporating member, a refrigerant liquefying apparatus separate from the tent, flexible tubular connections connecting the refrigerant liquefying apparatus with the closed evaporating member for supplying liquid refrigerant to and for withdrawing evaporated refrigerant from the closed evaporating member to cool the circulating atmosphere within the tent, and means for supplying oxygen to the tent.

2. Oxygen administering apparatus including a supporting member adapted to rest upon the floor, said supporting member having means extending upwardly from one side thereof, a tent structure supported by said upwardly extending means but located to one side thereof over said supporting member, a closed refrigerant evaporating member supported by said tent structure in heat exchange relation with the atmosphere within the tent, said supporting member having a refrigerant liquefying apparatus thereon, low in height and adapted to be moved under a bed with the tent directly over the bed and the upwardly extending means at one side of the bed, said refrigerant liquefying apparatus being connected to the closed evaporating member to supply liquid refrigerant and for withdrawing evaporated refrigerant from the closed evaporating member, and means for supplying oxygen within the tent.

3. Oxygen administering apparatus including a rigid frame structure, a closed refrigerant evaporating means supported by the frame structure and a covering means stretched over the frame structure forming a tent, said closed evaporating means being in heat exchange relation with the atmosphere within the tent, a refrigerant liquefying apparatus exposed to the atmosphere without the tent but connected in closed circuit relationship with the evaporating means to supply liquid refrigerant to and for withdrawing evaporated refrigerant from the evaporating means, and means for supplying oxygen to the tent.

4. Oxygen administering apparatus including a tent enclosing at least the head of the patient, a closed evaporating means in heat exchange relation with the atmosphere in the tent, a refrigerant liquefying means in closed circuit relation with said closed evaporating means for supplying liquid refrigerant to and for withdrawing evaporated refrigerant from the evaporating means, means for regulating the evaporating temperature of the evaporating means and thermostatic means for controlling the temperature of the atmosphere within the tent without changing said regulating means.

5. Oxygen administering apparatus including a movable tent structure having a relatively rigid supporting framework, a supporting structure connected to said framework for supporting the tent structure over a bed to enclose the head of a patient upon the bed, said supporting structure being adjustable to permit movement of the tent structure, a rigid duct means supported by said framework and in communication with and movable with said tent structure, a refrigerant evaporating means within said duct means, fan means for drawing air from the tent, circulating the air through said duct means in heat exchange relation with the evaporating means and returning the circulated air to the tent, a refrigerant liquefying means supported by said supporting structure independently of the tent structure, and flexible refrigerant conduit means connecting the liquefying means and the evaporating means.

6. Oxygen administering apparatus including a movable tent structure having a relatively rigid supporting framework, a supporting structure having an adjustable connection with said framework for supporting the tent structure over a bed to enclose the head of a patient in the bed, a refrigerant evaporating means fixed to the framework of said tent structure and in heat exchange relation with the atmosphere within the tent, a refrigerant liquefying means supported by said supporting structure independently of the tent structure, and flexible refrigerant conduit means connecting the liquefying means and the evaporating means.

7. Oxygen administering apparatus including a movable tent structure having a relatively rigid supporting framework, a supporting structure having an adjustable connection with said framework for supporting the tent structure over a bed to enclose the head of a patient in the bed, a refrigerant evaporating means fixed to the framework of said tent structure and in heat exchange relation with the atmosphere within the tent, a refrigerant liquefying means supported by said supporting structure independently of the tent structure, and flexible refrigerant conduit means connecting the liquefying means and the evaporating means, an oxygen supply means mounted upon said supporting structure, and flexible conduit means extending from the oxygen supply means into communication with the atmosphere in the tent.

8. Oxygen administering apparatus including a framework, a translucent sheet means supported by the framework and forming the top of a tent, said tent having side walls extending downwardly into contact with a bed for enclosing at least the head of a patient, a supporting means connected to said framework for supporting the tent over the bed, a refrigerant evaporating means supported by said framework in heat exchange relation with the atmosphere within the tent, means for supplying oxygen to the atmosphere of the tent, and a refrigerant liquefying means connected to said evaporating means.

9. Oxygen administering apparatus including a supporting member adapted to rest upon the floor, said supporting member having means extending upwardly from one side thereof, a tent structure supported by said upwardly extending means but located to one side thereof over said supporting member, a closed refrigerant evaporating member in heat exchange relation with the atmosphere within the tent, said supporting member having a refrigerant liquefying apparatus thereon, said supporting member being adapted to be moved under the bed with the tent directly over the bed and the upwardly extending means at one side of the bed, said refrigerant liquefying apparatus being connected to the closed evaporating member to supply liquid refrigerant and for withdrawing evaporated refrigerant from the closed evaporating member, and means for supplying oxygen to the atmosphere within the tent.

10. A portable self-contained oxygen administering and atmosphere cooling apparatus including a truck; a laterally extending tent carried by the truck; a refrigerating system carried entirely on the truck and including an evaporator, a compressor for withdrawing gaseous refrigerant from the evaporator and for compressing the same, an electric motor for driving the compressor, an air cooled condenser operatively connected with the compressor and evaporator; means carried on the truck and forming a duct system including the interior of the tent and the space about the evaporator; an oxygen tank carried by the truck and having its outlet connected into the duct system; and control means for the apparatus.

11. A portable self-contained oxygen administering and atmosphere cooling apparatus for use in combination with a bed and including a truck adapted to be positioned underneath the bed; a standard carried by the truck adjacent one end thereof and adapted to be positioned alongside the bed; a tent adapted to extend over the bed and carried by the standard; a refrigerating system carried entirely on the truck and adapted to be positioned underneath the bed, said refrigerating system including an evaporator, a compressor for withdrawing gaseous refrigerant from the evaporator and for compressing the same, an electric motor for driving the compressor, an air cooled condenser operatively connected with the compressor and evaporator; means carried on the truck and forming a duct system including the interior of the tent and the space about the evaporator; an oxygen tank carried by the truck and having its outlet connected into the duct system; and control means for the apparatus.

FRANK W. HARTMAN.